United States Patent
Ward et al.

(10) Patent No.: US 7,496,713 B1
(45) Date of Patent: Feb. 24, 2009

(54) METHOD AND APPARATUS FOR MAINTAINING CACHE COHERENCY IN A MEMORY SYSTEM WITH SHARED ONLY CACHE MEMORIES

(75) Inventors: Kenneth A. Ward, Shrewsbury, MA (US); Hugh R. Kurth, Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 307 days.

(21) Appl. No.: 10/896,291

(22) Filed: Jul. 21, 2004

(51) Int. Cl.
  *G06F 12/00* (2006.01)
  *G06F 13/00* (2006.01)
  *G06F 13/28* (2006.01)
(52) U.S. Cl. .......................... 711/141; 711/146; 711/20
(58) Field of Classification Search .................. 711/146
  See application file for complete search history.

(56) References Cited

U.S. PATENT DOCUMENTS 6,003,106 A * 12/1999 Fields et al. ................. 710/308

2004/0039880 A1 * 2/2004 Pentkovski et al. ......... 711/146

OTHER PUBLICATIONS

Daniel J. Sorin, Manoj Plakal, Anne E. Condon, Mark D. Hill, Milo M.K. Martin and David A. Wood, Specifying and Verifying a Broadcast and a Multicast Snooping Cache Coherence Protocol, IEEE Transactions on Parallel and Distributed Systems, vol. 13, No. 6, Jun. 2002, pp. 1-23.

* cited by examiner

*Primary Examiner*—Matt Kim
*Assistant Examiner*—Edward J Dudek
(74) *Attorney, Agent, or Firm*—Dorsey & Whitney LLP

(57) ABSTRACT

In data processing systems that use a snoopy based cache coherence protocol and which contain a read only cache memory with a bounded range of addresses, a cache line hit is detected by assuming that, if an address contained in a request falls within the bounded range, the cache line is present in the cache memory for snoop results. This is equivalent to assuming that the cache line is marked as shared when it might not be so marked.

28 Claims, 6 Drawing Sheets

METHOD AND APPARATUS FOR MAINTAINING CACHE COHERENCY IN A MEMORY SYSTEM WITH SHARED ONLY CACHE MEMORIES

FIELD OF THE INVENTION

This invention relates to maintaining cache memory coherency in data processing systems, and specifically to maintaining coherency of a shared-only cache memory in a data processing system.

BACKGROUND OF THE INVENTION

In conventional data processing systems, cache memories are often used to improve performance and reduce the use of limited system bus resources. A cache memory is typically a small high-speed memory that is dedicated to a device, such as a processor, and connected to the device by a special bus. During the normal course of operations, as each processor reads data from main memory locations, it stores the data value and its main memory address in the cache memory in a unit called a "cache line". Since a processor frequently reads from the same memory locations as it executes program or operating system code, once the corresponding cache lines have been stored in the cache memory, the processor can read the data directly from the cache memory and does not need to read the main memory using the system bus.

A conventional data processing system 100 incorporating cache memories is shown as a block schematic diagram in FIG. 1. In a system of this type one or more processors 102, 104 are connected by a host bus 110 to a host bridge 112. Each of processors 102, 104 is provided with a cache memory 106, 108, respectively, located in the data path between the processor and the host bus 110. Cache memories 106 and 108 are typically provided with a cache memory controller (not shown in FIG. 1) that controls and coordinates the operation of the associated cache memory.

Each processor is also provided with an associated memory. For example, processor 106 is provided with memory 107 and processor 108 is provided with memory 109. Although memories 107 and 109 are illustrated as attached to the respective cache memories, each processor would typically have a memory controller (not shown) that manages its associated memory. The host bridge 112 manages the communications between the processors 102, 104 and video devices 114, such as monitors, as indicated schematically by line 116. The host bridge also manages communication between the processors 102 and 104 and peripherals 124, 126 via a peripheral bus 122.

Data can also be stored in a cache memory, for example, cache memory 106 by its associated processor 102 during a memory write operation. In this type of operation, data to be written into memory 107 and its associated memory address is instead written into the cache memory 106. The data values written to the cache memory 106 can be "flushed" or written to memory 107 at the addresses stored in the cache memory with the data either at the time that the information is written into the cache memory 106 or at a later time.

This caching technique can also be used to improve the performance of other system components, such as memory management units (MMUs). For example, in a memory mapped input/output (I/O) system, an I/O MMU 128 located in the host bridge 112 may be used to translate between logical I/O addresses and physical device addresses. The I/O addresses are typically divided into blocks and each block of addresses is mapped by the MMU to a corresponding block of actual physical I/O device addresses. The mapping between I/O addresses and physical addresses is specified by a page table directory 132 that is stored in one of the processor memories, for example memory 109. An I/O MMU 128 typically contains a small "translation lookaside buffer" (TLB) 130 to cache some I/O address space to physical address space translations in order to avoid repeatedly fetching translations from the page table directory 132 for every I/O address to physical address transaction. The operation of the TLB 130 is similar to the operation of a processor cache memory 102, 104 except that typically the TLB 130 can be read by the I/O MMU 128, but not written by the MMU 128.

Often, in a multiprocessor system such as system 100, the processors 102, 104 operate with a shared memory area that is duplicated in both of the memories 107 and 109. When all of the processors 102, 104 share a single logical image of the shared memory, the system is said to be "coherent." In a coherent system, if all of the processors 102, 104 read data from the same memory address, they all receive the same data value. Achieving memory coherence is complicated by the use of cache memories, such as cache memories 102, 104 and 130. In particular, because each processor 102, 104 or I/O MMU 128 in a multiprocessing system has its own private copy of small portions of the shared memory area in its dedicated cache memory 106, 108 or TLB 130, these copies can deviate from one another. For example, when a processor, such as processor 102, writes data into its cache memory 106 and changes the value that was located there, the value in that memory 106 may differ from a corresponding value in all other cache memories that contain a corresponding cache line and from the shared memory area in memories 107 and 109. Accordingly, a read to the same location in either its associated memory 109 or its cache memory 108 by another processor 104 can retrieve different data—the system is no longer coherent. A similar problem can occur in MMUs when entries in the page table directory 132 in memory 109 are changed by other software, such as direct memory access (DMA) software. In this latter case, the MMU 128 sees an incoherent view of memory 109.

A common method of solving this memory coherence problem is called "bus snooping." In this technique, when a request for a read or write transaction to a cache memory is made to a cache memory controller, that controller broadcasts the request to all other cache memory controllers either over the normal system bus or over a special snooping bus. This request may be the virtual address provided to the controller or a physical address which is generated by the controller from the virtual address using conventional address translation facilities. When such a request is detected, each cache controller "snoops" its associated cache memory to determine whether the corresponding cache line is stored in the cache memory and is marked as shared by the other processors. "Snoop results" are generated from this determination and used to address the memory incoherency in known manners. For example, the controller may invalidate the (now incorrect) cache line if the request was a write request. Alternatively, it may forward a changed data value from its cache to the controller that received an original read transaction to insure that both caches contain the same values.

Bus snooping can maintain memory coherency, but may adversely affect system performance. For example, a typical method for determining whether a particular cache line is present in a cache memory is to propagate the address in the request to the cache memory and use the normal cache memory "hit" mechanism to determine whether that line is in the cache memory (a "hit" occurs) and the line is marked as shared. However, because the cache memory controller must also examine the contents of the cache memory during the normal processing of each transaction, the snooping operations can slow down processing of the normal cache access requests received from processors or I/O MMUs.

Several techniques have been developed to prevent this dual access from affecting cache memory speed. For example, a special dual ported cache memory may be used. This memory has a "cache hit port" that can be used by the cache controller to access the cache memory to determine whether a snooping hit occurs at the same time that the controller is accessing the memory via the other memory port in order to service requests from a processor or an I/O MMU. Nevertheless, because the transaction address must still be propagated within the cache memory to determine whether a hit occurs, cache memory processing can still be slowed. In addition, a special dual-ported memory is required. Further, since the cache memory must still be examined in order to determine whether a hit occurs, it may take some time to generate the snoop results.

Another approach to improving snooping performance is to separate each cache line into its data portion and its address portion (called a "tag".) Then the data portions of the cache lines are stored in a cache data store and the tag portions are stored in a tag store. In order to improve snooping performance, duplicate tag stores are used. One tag store is examined by the cache controller to detect a cache line hit during a snooping operation and the other tag store is used for normal processor or MMU cache line hit detection. The duplicate tag store technique avoids requirement for a separate hit port and produces the snoop results quickly, but the duplicate tag structure is costly because it usually contains critical paths and requires large numbers of gates to implement.

Therefore, there is a need for a simple mechanism to maintain cache coherency.

SUMMARY OF THE INVENTION

In accordance with the principles of the invention, in a read only cache memory which can contain a bounded range of physical addresses, a cache line hit is detected by assuming that, if a physical address contained in a request falls within the bounded range, the cache line is present in the cache memory for snoop results. This is equivalent to assuming that the cache line is marked as shared when it might not be so marked.

The result of this assumption is that a cache line hit can be detected by comparing a request address against the bounds of the cache address range and declaring a hit if the address falls within the range.

In one embodiment, the range of addresses in the cache memory are a contiguous region of physical memory the extent of which is specified by values in a region base register and a region bounds register. In this embodiment, If physical snoop request addresses are broadcast, a cache line hit is detected by comparing the request address to the addresses in the region base and bounds registers and declaring a cache line hit if the request address is greater or equal to the value in the base register and less than or equal to the value in the bounds register. Alternatively, if virtual addresses are broadcast, then the physical addresses in the base and bounds registers are converted to virtual addresses and the virtual addresses are used for the comparisons.

In one embodiment, the address range comparisons are implemented in hardware and in order to quickly return snoop results.

In another embodiment, a cache line address that falls within the cache address range limits is forwarded to the I/O MMU for invalidation when invalidation is required (a write request is received) and the cache line is present.

BRIEF DESCRIPTION OF THE DRAWINGS

The above and further advantages of the invention may be better understood by referring to the following description in conjunction with the accompanying drawings in which.

DETAILED DESCRIPTION

Figure 1:
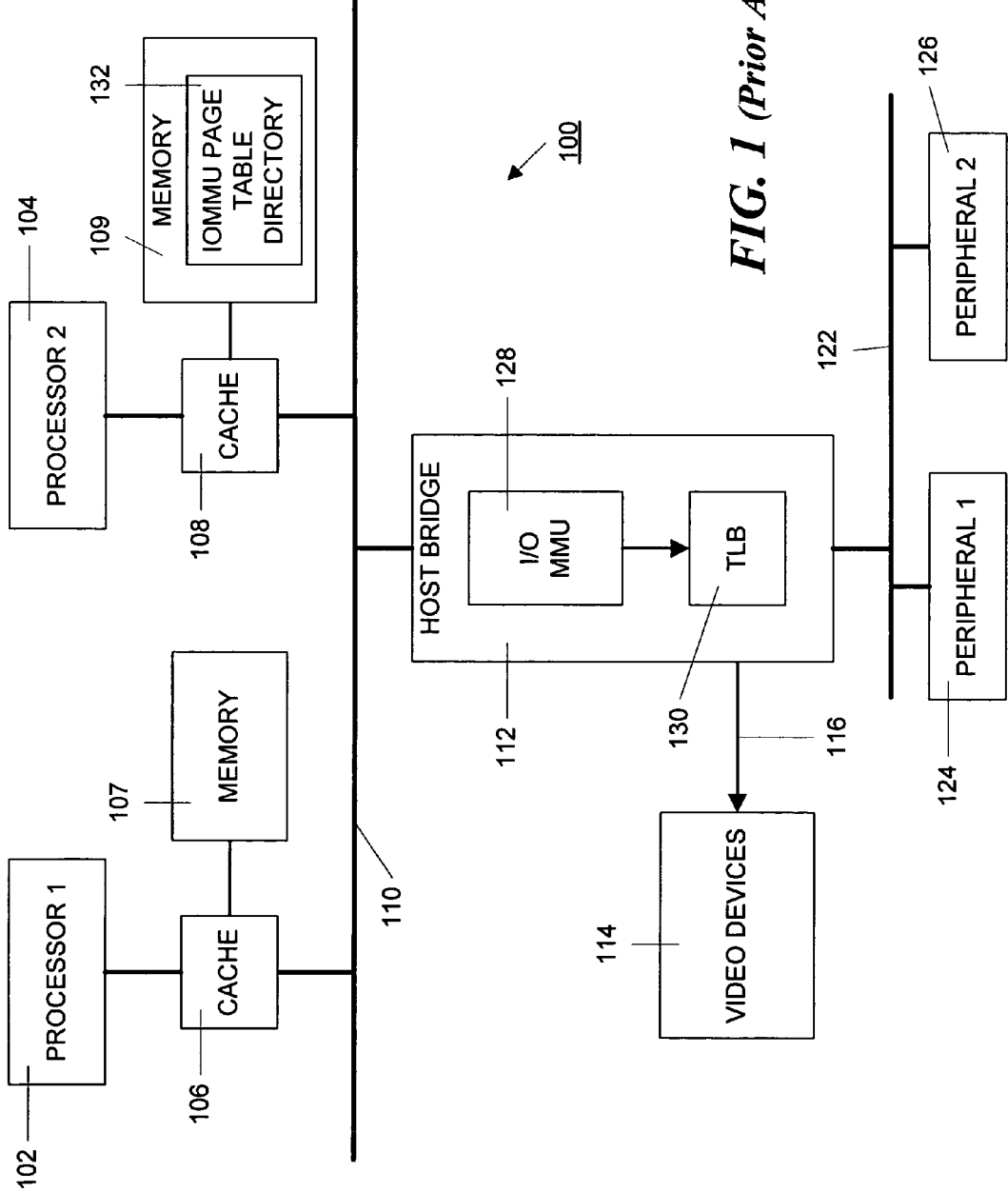
FIG. 1 is a block schematic diagram of a conventional multiprocessing system illustrating the use of cache memories.
Figure 2:
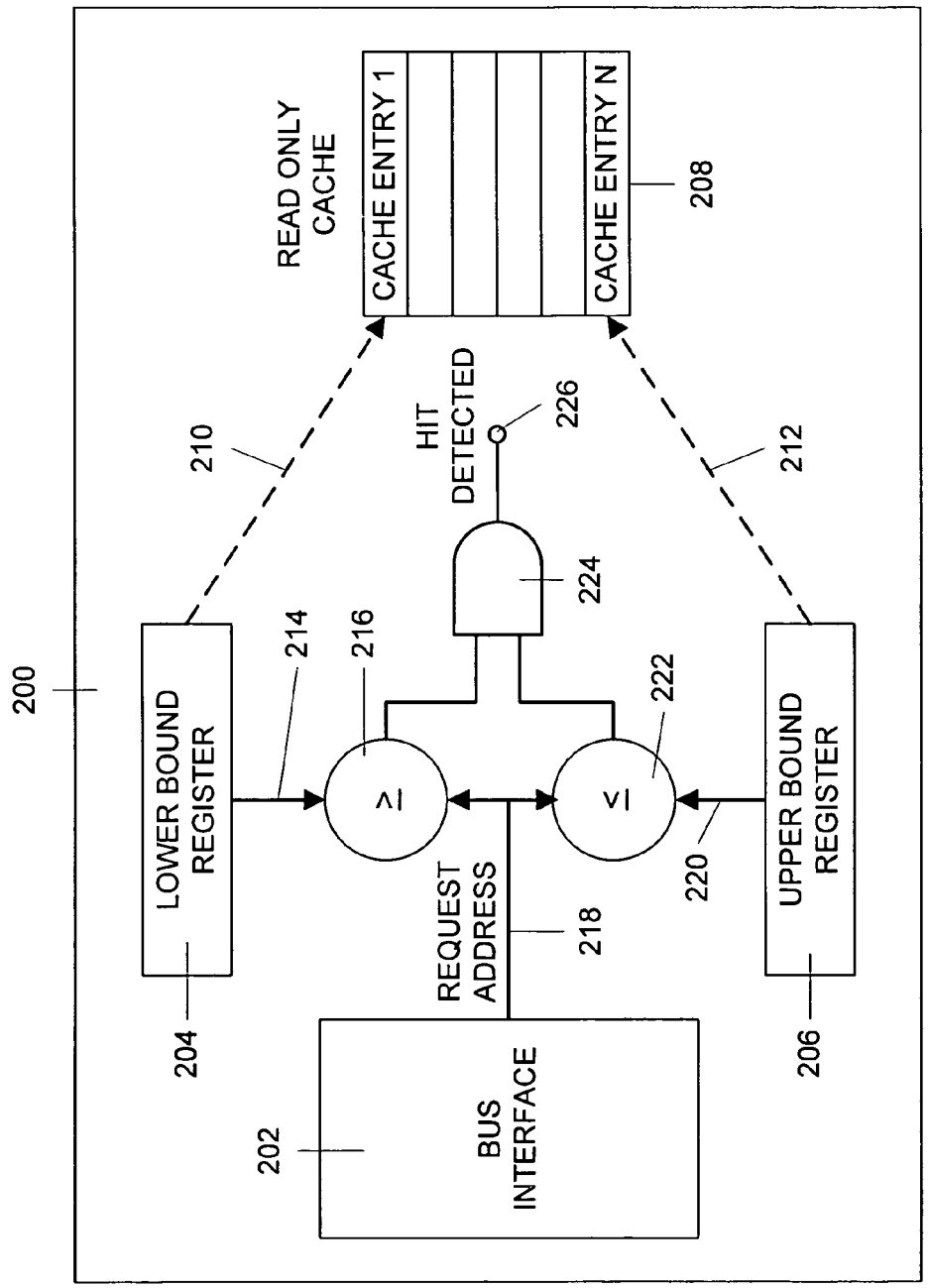
FIG. 2 is a block schematic diagram of a mechanism for detecting a cache line hit in response to a broadcast request in accordance with the principles of the invention.
Figure 3:
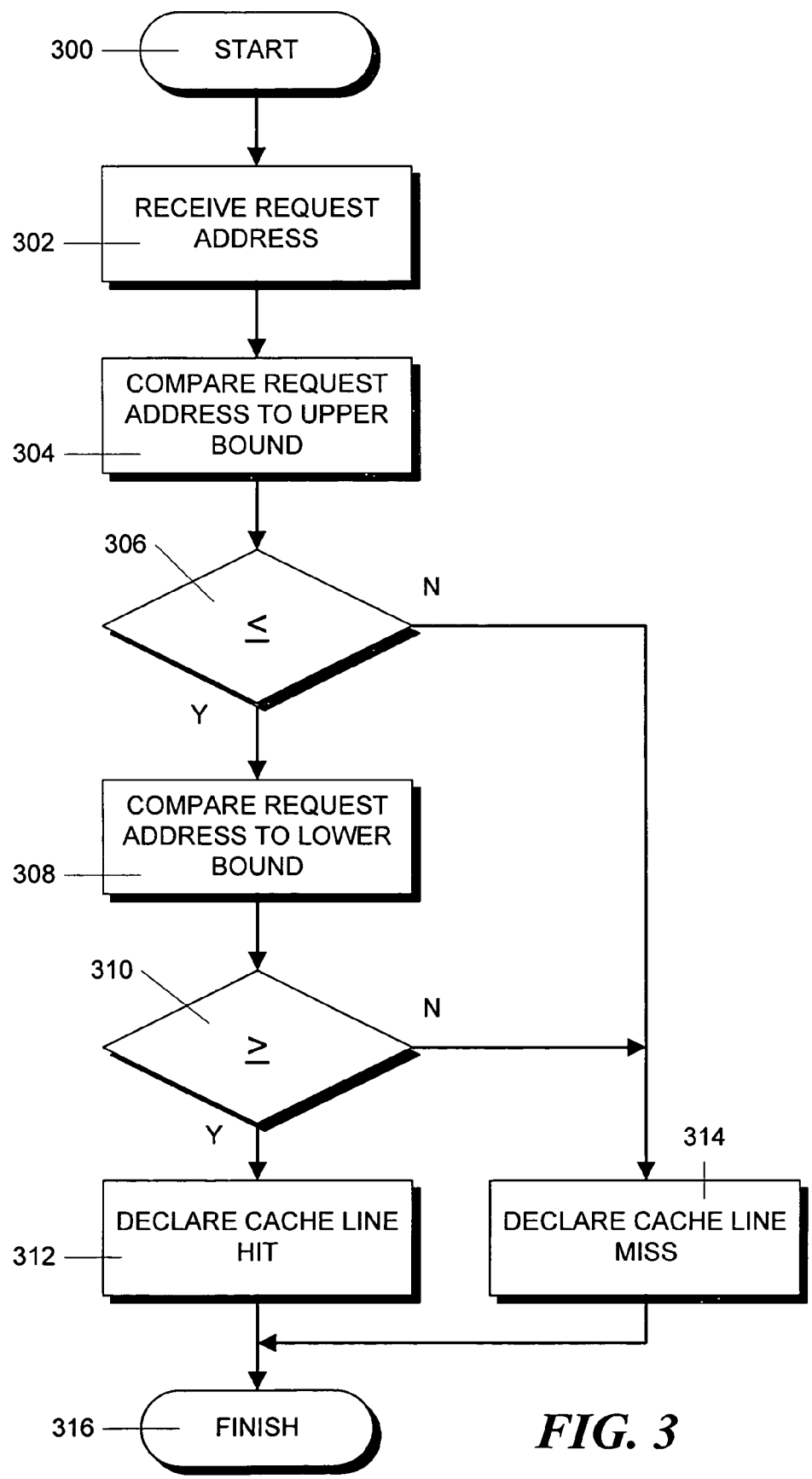
FIG. 3 is a flowchart showing steps in an illustrative process for detecting a cache line hit using the apparatus illustrated in FIG. 2.

FIG. 2 is a block schematic diagram of a mechanism 200 that can be used to implement the principles of the present invention. This mechanism operates in accordance with the process illustrated in FIG. 3. This process starts in step 300 and proceeds to step 302 where the request address is received. In general, the broadcast request is received over either the system bus or a special snooping bus as previously described. In this embodiment, the request address is a physical address. The request is received at an appropriate bus interface 202 and the physical request address is extracted and applied, as indicated schematically by arrow 218, to two comparators 216 and 222. In step 304, the request address is compared by comparator 222 to the contents of the upper bounds register 206 as indicated schematically by arrow 220. Upper bound register 206 has been previously loaded with the physical address in the last entry in the cache 208 as indicated schematically by arrow 212. As previously mentioned, cache 208 comprises a contiguous range of physical addresses. The first physical address in the region has previously been loaded into the lower bound register 204 as indicated schematically by arrow 210.

If, in step 306, it is determined by comparator 222 that the request address is less than or equal to the contents of the upper bound register, then the process proceeds to step 308 where the request address is compared by comparator 216 to the contents of the lower bounds register 204 as indicated schematically by arrow 214. If, in step 310, it is determined by comparator 216 that the request address is greater than or equal to the contents of the lower bound register, then the process proceeds to step 312 where a cache line hit is declared. The process then finishes in step 316.

Alternatively, if, in step 306, it is determined that the request address is greater than the contents of the upper bounds register, then the process proceeds to step 314 where a cache line miss is declared. Similarly, if, in step 310, it is determined that the request address is less than the contents of the lower bounds register, then the process proceeds to step 314 where a cache line miss is declared. In either case, the process ends in step 316.

An advantage of this system is that cache hits can be detected by simple logic exemplified by the comparators and AND gate shown in FIG. 2. Thus, no dual-port memory or dual tag stores need to be implemented. Further, the cache line hit mechanism can be easily implemented in either hardware or software.

Since the cache memory 208 is read only to any processor that it serves, the only way that cache lines can be modified is via an incoming snooping request. Thus, it can be safely assumed that any such request that contains an address within the address range served by the cache 208 should return snoop results. This assumption is equivalent to assuming that any cache line that is the subject of a cache line hit is marked as shared even thought it might be marked as exclusive. This assumption does affect any cache coherency protocol then in effect. A cache coherency protocol is a scheme for coordinating access to shared blocks of memory. In general, whether a particular processor can access a cache block in an associated cache is determined by the state of that block as recorded in the cache. In a common protocol this state is one of five states called MOESI states (Modified, Owned, Exclusive, Shared and Invalid). A processor can issue requests, such as Get Exclusive and Get Shared to gain access to a particular block. In the example discussed above, a processor associated with cache 208 can only issue Get Shared requests.

The assumption that lines within the cache bounds are always marked as shared affects any processor caches that include these cache line entries as the result of cache reads and writes. In this case, the potentially incorrect snoop response generated by the inventive cache line hit detection technique will prevent these latter caches from ever having a cache line in the read-only cache address range in the exclusive state of the MOESI cache coherency protocol.

The operation of the inventive system is effectively the same if the request address is virtual, with the exception that the physical addresses of the upper and lower bounds of the read only cache region are first translated to virtual address before being loaded into the respective registers.

Figure 4:
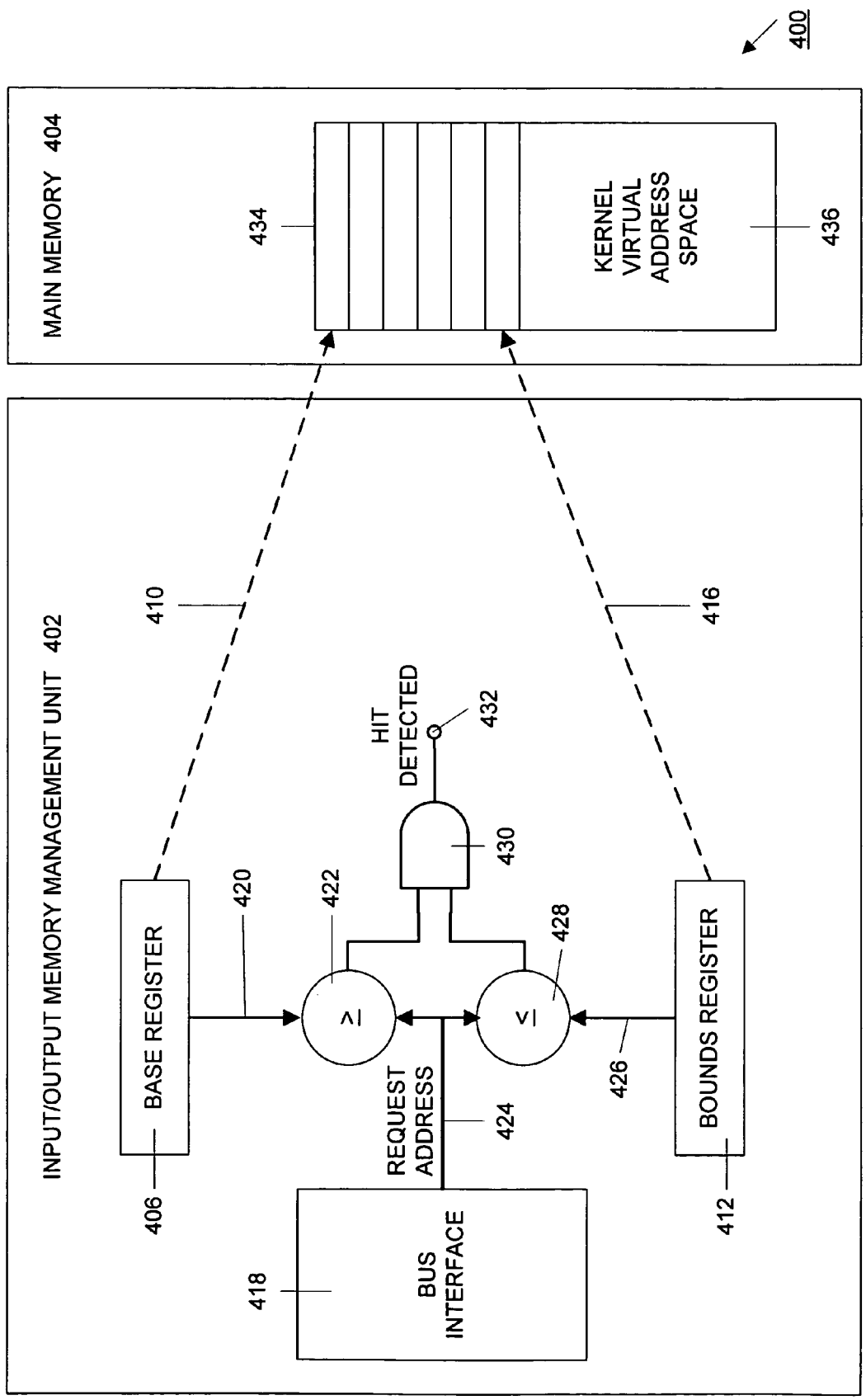
FIG. 4 is a more detailed block diagram of an I/O MMU in a data processing system capable of performing a direct virtual memory access and containing a mechanism for detecting a cache line hit in response to a broadcast request in accordance with the principles of the invention.

FIG. 4 shows an example of a system 400 that uses the inventive principles. This system implements a form of Direct Virtual Memory Access (DVMA). An example of such a system is the Solaris 2.x operating system running on a SPARC processing platform developed and marketed by Sun Microsystems, Inc. In this type of system, the system provides a virtual address to a peripheral device to perform direct memory, transfers. The SPARC platform supports the DVMA transfers via an I/O MMU 402 in the host processor bridge.

Figure 5:
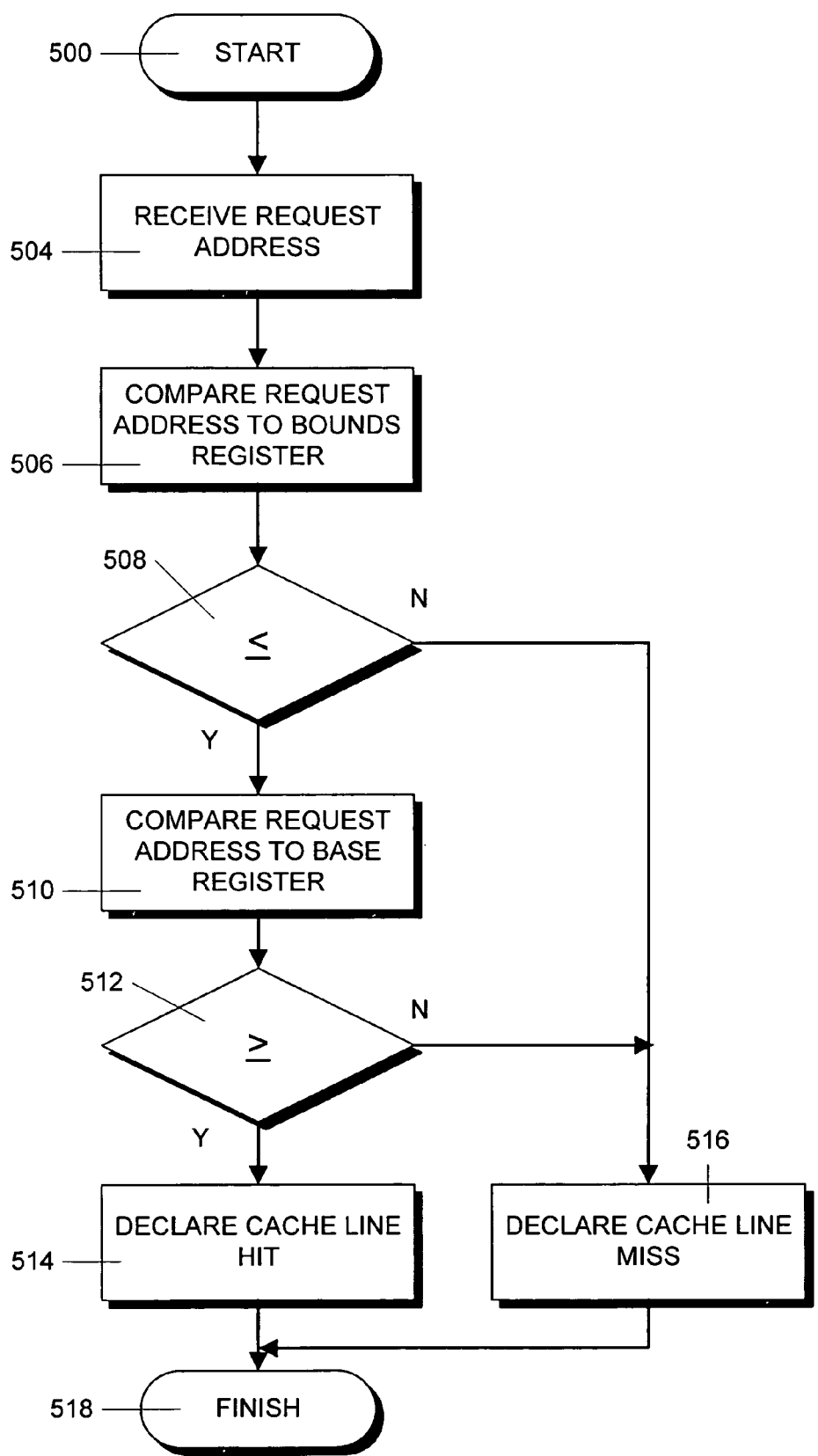
FIG. 5 is a flowchart showing steps in an illustrative process for detecting a cache line hit using the apparatus illustrated in FIG. 4.

The process of a DVMA transfer is illustrated in FIG. 5. This process begins in step 500 and proceeds to step 502 where the base and bounds registers are loaded. To initiate a DVMA transfer, during DVMA setup, a peripheral device driver (not shown in FIG. 4) establishes mappings between DMA objects in the main memory 404 and DVMA resources in a portion of the address space 436 assigned to the operating system kernel. A DMA object is a contiguous physical memory area that is represented by a kernel virtual address. The DVMA resource is a contiguous virtual page region in the kernel virtual address space, which page region is dedicated for DVMA transfers. DVMA pages usually occupy the top end of the kernel virtual address space 436. There is a one-to-one correspondence between a DVMA page in the kernel address space 436 and a TLB entry. Thus, the size of the DVMA address space is the number of entries in the TLB multiplied by the page size.

The base register and the bounds register are generally loaded at this point as these registers are used for conventional memory protection. The base register is thus loaded with the physical address of the low end of the DVMA page region 434 (as indicated schematically by arrow 410) and the bounds register is loaded with the upper address of the DVMA page region (as indicated schematically by arrow 416).

In step 504, the request address is received, for example over a special snooping bus, as previously described. The request is received at an appropriate bus interface 412 and the physical request address is extracted and applied, as indicated schematically by arrow 424, to two comparators 422 and 428. In step 506, the request address is compared by comparator 428 to the contents of the bounds register 412 as indicated schematically by arrow 426.

If, in step 508, it is determined by comparator 428 that the request address is less than or equal to the contents of the bounds register 412, then the process proceeds to step 510 where the request address is compared by comparator 422 to the contents of the base register 406 as indicated schematically by arrow 420. If, in step 512, it is determined by comparator 422 that the request address is greater than or equal to the contents of the base register 406, then the process proceeds to step 514 where a cache line hit is declared. The process then finishes in step 518.

Alternatively, if, in step 508, it is determined that the request address is greater than the contents of the bounds register 412, then the process proceeds to step 516 where a cache line miss is declared. Similarly, if, in step 512, it is determined that the request address is less than the contents of the base register 406, then the process proceeds to step 516 where a cache line miss is declared. In either case, the process ends in step 518.

Figure 6:
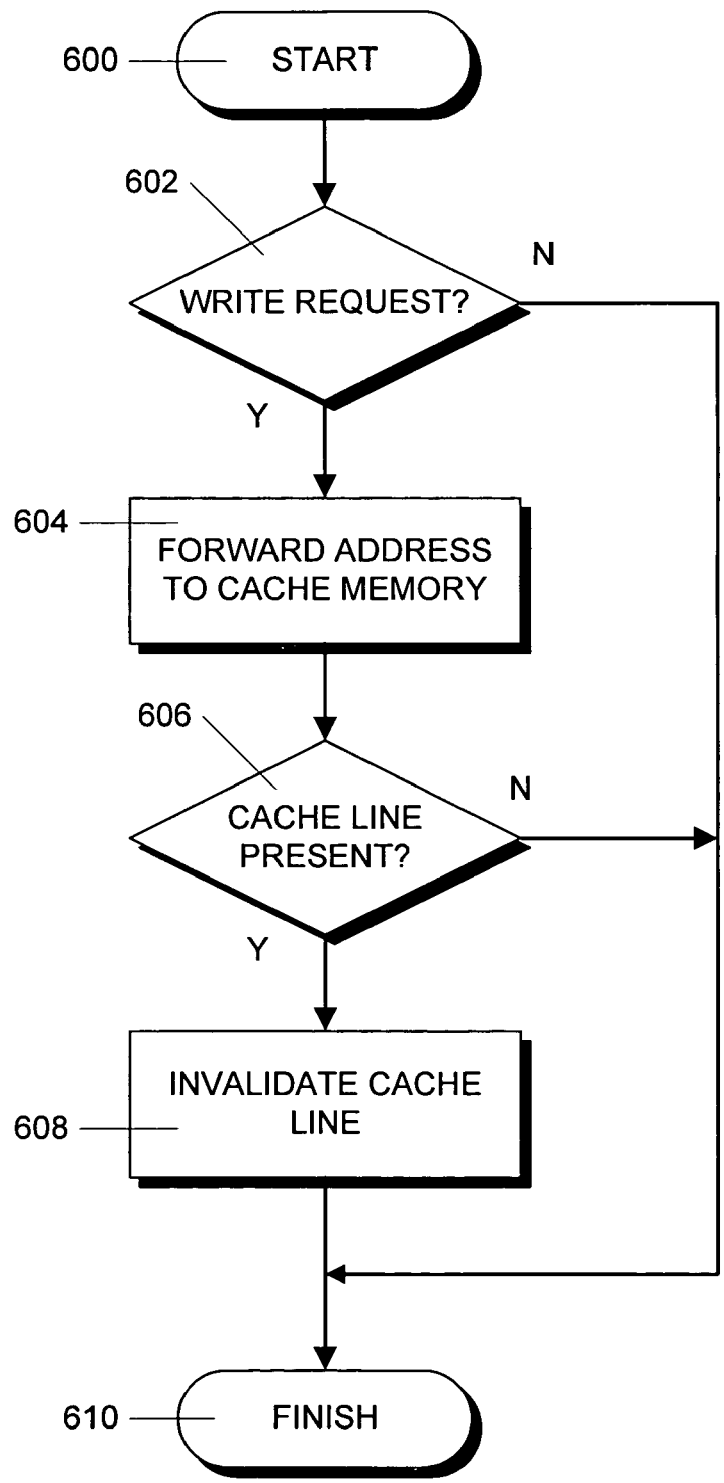
FIG. 6 is a flowchart showing steps in an illustrative process for further processing of a cache line entry after a cache "hit" has been declared.

Once a cache hit has been declared, as previously mentioned, further processing can be performed to process the cache line entry accordingly. An example of such processing is shown in FIG. 6. This process begins in step 600 and proceeds to step 602 where a determination is made whether the snoop request is for a write transaction. If not, the process ends in step 610. However, if the request was for a write transaction, then the address of the cache line that was declared a "hit" is forwarded to the cache memory (or IOMMU) controller in step 604. The controller then determines whether the cache line is actually present in the cache memory in step 606. If not the process finishes in step 610. If the cache line is present as determined in step 606, then, in step 608, the cache line is invalidated in the cache memory.

The process described above can also be varied in order to reduce the snooping bandwidth. For example, in one embodiment, all processor addresses that cause a miss in their respective cache memories generate a snooping request. However, in another embodiment, where an IOMMU is dedicated to each processor and the TLB of that IOMMU is the only cache in the system outside of the processor, the processor itself could employ a base and bounds check similar to that employed by the IOMMU in the above description and only generate a snooping request when an address that generates a cache miss falls within the IOMMU TLB address range.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different methods could be used for determining whether a cache line hit has occurred. The order of the process steps may also be changed without affecting the operation of the invention. For example, the comparison of the request address to the upper and lower bounds may be performed in an order opposite to that shown or in parallel. Other aspects, such as the specific process flow, as well as other modifications to the inventive concept are intended to be covered by the appended claims.

What is claimed is:

1. A method for maintaining cache coherency in a data processing system that uses a snoopy based cache coherence protocol and that contains a read only cache memory with a bounded range of addresses and at least one other cache memory, comprising:
   (a) receiving at the read only cache memory, a cache transaction request from the other cache memory containing a request address;
   (b) determining whether the request address contained in a request falls within the bounded range of addresses; and
   (c) returning snoop results of shared or invalid to the other cache memory.

2. The method of claim 1, wherein returning snoop results comprises:
   returning the snoop result of shared when the request address falls within the bounded range of addresses; and
   returning the snoop result of invalid when the request address falls outside of the bounded range of addresses.

3. The method of claim 1 wherein step (a) comprises receiving the cache transaction request over a system bus.

4. The method of claim 1 wherein step (a) comprises receiving the cache transaction request over a dedicated snooping bus.

5. The method of claim 1 wherein step (b) comprises comparing the request address with an upper bound and a lower bound of the bounded range of addresses.

6. The method of claim 5 wherein step (c) comprises returning snoop results of shared to the other cache memory declaring the cache line is present in the read only cache memory when the request address is less then or equal to the upper bound and greater than or equal to the lower bound.

7. The method of claim 5 wherein step (c) comprises returning snoop results of invalid to the other cache memory declaring the cache line is not present in the read only cache memory when the request address is greater than the upper bound or less than the lower bound.

8. The method of claim 1 further comprising:
   (d) invalidating the cache line in the read only cache memory if the cache transaction request is for a write transaction, a cache memory hit is declared and the cache line is present in the read only cache memory.

9. The method of claim 1 wherein the request address is a physical address.

10. The method of claim 1 wherein the request address is a virtual address.

11. Apparatus for maintaining cache coherency in a data processing system that uses a snoopy based cache coherence protocol and that contains a read only cache memory with a bounded range of addresses and at least one other cache memory, comprising:
    a bus interface that receives at the read only cache memory, a cache transaction request from the other cache memory containing a request address;
    a comparison mechanism that determines whether the request address contained in a request falls within the bounded range of addresses; and
    a mechanism that returns snoop results of shared to the other cache memory indicating the cache line is present in the read only cache memory when the request address falls within the bounded range of addresses.

12. The apparatus of claim 11 further comprising a mechanism that returns snoop results of invalid to the other cache memory indicating the cache line is not present in the read only cache memory when the request address falls outside of the bounded range of addresses.

13. The apparatus of claim 11 wherein the bus interface comprises a mechanism that receives the cache transaction request over a system bus.

14. The apparatus of claim 11 wherein the bus interface comprises a mechanism that receives the cache transaction request over a dedicated snooping bus.

15. The apparatus of claim 11 wherein the comparison mechanism comprises a comparator that compares the request address with an upper bound and a lower bound of the bounded range of addresses.

16. The apparatus of claim 15 wherein the mechanism that returns snoop results to the other cache memory comprises a mechanism that returns the snoop result of shared to the other cache memory declaring the cache line is present in the read only cache memory when the request address is less then or equal to the upper bound and greater than or equal to the lower bound.

17. The apparatus of claim 15 wherein the mechanism that returns snoop results to the other cache memory comprises a mechanism that returns the snoop result of invalid to the other cache memory declaring the cache line is not present in the read only cache memory when the request address is greater than the upper bound or less than the lower bound.

18. The apparatus of claim 11 further comprising a mechanism that invalidates the cache line in the read only cache memory if the cache transaction request is for a write transaction, a cache memory hit is declared and the cache line is present in the read only cache memory.

19. The apparatus of claim 11 wherein the request address is a physical address.

20. The apparatus of claim 11 wherein the request address is a virtual address.

21. Apparatus for maintaining cache coherency in a data processing system that uses a snoopy based cache coherence protocol and that contains a read only cache memory with a bounded range of addresses and at least one other cache memory, comprising:
- means for receiving at the read only cache memory, a cache transaction request from the other cache memory containing a request address;
- means for determining whether the request address contained in a request falls within the bounded range of addresses; and
- means for returning snoop results of shared to the other cache memory indicating the cache line is present in the read only cache memory when the request address falls within the bounded range of addresses.

22. The apparatus of claim 21 further comprising means for returning snoop results of invalid to the other cache memory indicating the cache line is not present in the read only cache memory when the request address falls outside of the bounded range of addresses.

23. The apparatus of claim 21 wherein the means for determining whether the request address contained in a request falls within the bounded range of addresses comprises means for comparing the request address with an upper bound and a lower bound of the bounded range of addresses.

24. The apparatus of claim 21 further comprising means for invalidating the cache line in the read only cache memory if the cache transaction request is for a write transaction, a cache memory hit is declared and the cache line is present in the read only cache memory.

25. An article of manufacture comprising a computer program product for maintaining cache coherency in a data processing system that uses a snoopy based cache coherence protocol and that contains a read only cache memory with a bounded range of addresses and at least one other cache memory, the computer program product comprising a computer readable medium having computer readable program code thereon, including:
- program code for receiving at the read only cache memory, a cache transaction request from the other cache memory containing a request address;
- program code for determining whether the request address contained in a request falls within the bounded range of addresses; and
- program code for returning snoop results of shared or invalid to the other cache memory.

26. The article of manufacture of claim 25, wherein returning snoop results comprises:
- returning the snoop result of shared indicating the cache line is present in the read only cache memory when the request address falls within the bounded range of addresses; and
- returning the snoop result of invalid indicating the cache line is not present in the read only cache memory when the request address falls outside of the bounded range of addresses.

27. The article of manufacture of claim 25 wherein the program code for determining whether the request address contained in a request falls within the bounded range of addresses comprises program code for comparing the request address with an upper bound and a lower bound of the bounded range of addresses.

28. The article of manufacture of claim 25 further comprising program code for invalidating the cache line in the read only cache memory if the cache transaction request is for a write transaction, a cache memory hit is declared and the cache line is present in the read only cache memory.

* * * * *